C. W. FINZEL.
DRAINING SUGAR.
No. 7,616. Patented Sept. 3, 1850.
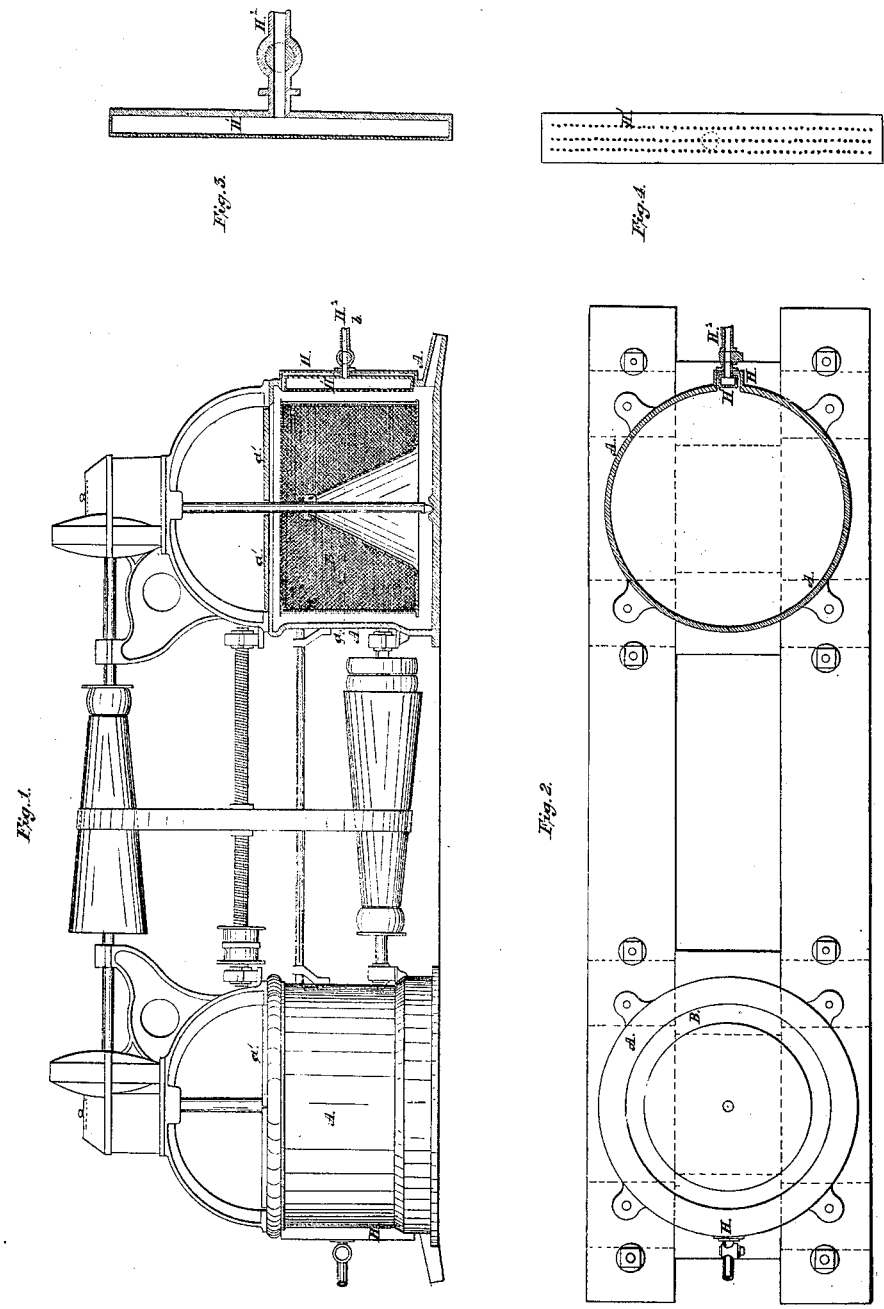

UNITED STATES PATENT OFFICE.

CONRAD W. FINZEL, OF BRISTOL, ENGLAND.

IMPROVEMENT IN DRAINING SUGAR.

Specification forming part of Letters Patent No. 7,616, dated September 3, 1850.

*To all whom it may concern:*

Be it known that I, CONRAD WILLIAM FINZEL, of the city and county of Bristol, sugar refiner, a subject of the Queen of Great Britain, have invented or discovered certain new and useful Improvements in the Processes and Machinery Employed in and Applicable to the Manufacture of Sugar; and I, the said CONRAD WILLIAM FINZEL, do hereby declare that the nature of the said improvements and in what manner the same are to be performed are fully described and ascertained in and by the present specification thereof, reference being had to the drawings hereunto annexed—that is to say:

First, my invention consists in a mode of applying steam or liquids to machines used for separating fluids from sugar by means of centrifugal force, for the purpose of clearing and keeping clear the meshes or apertures in the periphery of the revolving cylinders of such machines. Heretofore when it has been attempted to extract the molasses or sirups from sugar by centrifugal-acting machines the sugar has been found speedily to clog and stop up the meshes or apertures in the periphery of the revolving cylinder thereof, and thus materially impede the operation of the machinery. Now, my improvement in this part of my invention has for its object the overcoming this difficulty.

Figure 1 is an elevation, partly in section, of a centrifugal-acting machine, which is now in common use, to which has been added a steam box or apparatus constructed according to my said invention. Fig. 2 is a horizontal section on the line $a\,b$ of Fig. 1.

H is a narrow recess for receiving such steam box or apparatus, which is formed in the outer casing, A, and is about the same height as the revolving cylinder B.

H' is a steam box or chest, which is placed in the said recess, and is connected by a pipe, H², with a steam-boiler or any other source of steam-supply. The box H' is perforated with small holes on the side opposite or facing the periphery of the revolving cylinder, so that when the steam is let on it projects jets of steam against the periphery of the cylinder as it revolves, the lids $a'\,a'$ serving to prevent such steam from escaping from the machine. A longitudinal section and plan of the box are given separately on an enlarged scale in Figs. 3 and 4.

The mode of operation with the machine as thus improved may be thus exemplified: The sugars intended to be operated upon, having been first mixed with molasses or sirups to bring them up to a proper degree of consistency, are then placed in the cylinder B. Motion is now given to the machine, and after it has made a few turns the steam is to be let on and allowed to issue freely against the external surface of the periphery of the cylinder for about one minute, which has the effect of clearing and keeping clear the meshes or apertures of the periphery. Then (and without stopping the machine) the state of the sugar contained in the cylinder may be ascertained from time to time during the process by raising the lids $a'\,a'$. If the extraction of the moisture from the sugar appears upon inspection to be impeded, the steam is to be again let on for a short space of time for the purpose of clearing the meshes or apertures, as before. The rotation of the machine is to be kept up and the occasional steaming (when necessary) repeated until the whole or nearly the whole of the sirup or fluid is extracted from the sugar, and in operating upon ordinary sugars the process will generally be completed in a few minutes. Sugars taken from the evaporating-pan may, after partial cooling, be placed in the machine and operated upon in this way, and sugars in this state of course require no siruping or mixing.

Instead of steam, liquids may by means of my invention and of a force-pump or other similar-acting machinery be thrown against the exterior of the periphery of the cylinder, but, as I believe, with less advantage, and I prefer steam, as being in my opinion more advantageous.

Having now described the nature of my said invention and the manner in which the same is to be performed, I declare that I claim as of my invention—

The mode of applying steam or liquids to machines used for separating sirups or fluids from sugar by means of centrifugal force, for the purpose of clearing and keeping clear the meshes or apertures in the periphery of the revolving cylinders of such machines, in manner herein described.

CONRAD WM. FINZEL.

Witnesses:
  W. BRITTAN,
    *Attorney-at-Law, Bristol.*
  R. A. BROOMAN,
    166 *Fleet Street, London.*